United States Patent [19]
Bergin

[11] Patent Number: 5,813,644
[45] Date of Patent: Sep. 29, 1998

[54] CONTAINER HOLDER WITH SEPARABLE SUPPORT

[75] Inventor: Peter W. A. Bergin, Hopkins, Minn.

[73] Assignee: MTS Northwest, Sound, Inc., Minneapolis, Minn.

[21] Appl. No.: 585,801

[22] Filed: Jan. 16, 1996

Related U.S. Application Data

[63] Continuation-in-part of Ser. No. 34,727, Feb. 10, 1995, Pat. No. Des. 368,628.

[51] Int. Cl.$^6$ ..................................................... A47K 1/08
[52] U.S. Cl. .................. 248/311.2; 248/312; 297/188.04
[58] Field of Search ............................ 248/311.2, 311.3, 248/312.1, 309.1, 309.2, 316.8, 221.11, 222.14, 224.8, 225.21; 297/188.01, 188.04, 188.06, 188.2

[56] References Cited

U.S. PATENT DOCUMENTS

| | | | |
|---|---|---|---|
| D. 162,959 | 4/1951 | Janes et al. ............................... | D58/26 |
| D. 244,302 | 5/1977 | Bradley ..................................... | D27/14 |
| D. 299,482 | 1/1989 | Pearson ..................................... | D7/620 |
| D. 307,852 | 5/1990 | Clark ......................................... | D7/620 |
| D. 319,951 | 9/1991 | Frankel ..................................... | D7/620 |
| D. 328,223 | 7/1992 | Clark ......................................... | D7/622 |
| D. 342,871 | 1/1994 | Stern et al. ............................... | D7/620 |
| D. 344,826 | 3/1994 | Vandergon ................................ | D7/620 |
| D. 346,996 | 5/1994 | Blackburn ................................ | D7/620 |
| D. 368,628 | 4/1996 | Bergin ...................................... | D7/620 |
| 1,149,541 | 8/1915 | Rees et al. . | |
| 1,484,001 | 2/1924 | Ainsworth ............................... | 248/916 |
| 1,680,469 | 3/1928 | Morgan . | |
| 2,132,331 | 10/1938 | Wanamaker ............................. | 155/1 |
| 2,319,109 | 5/1943 | Bulloch .................................... | 272/57 |
| 2,471,030 | 5/1949 | Foulke ...................................... | 211/75 |
| 2,706,516 | 4/1955 | Nordmark ................................ | 155/188 |
| 2,807,315 | 9/1957 | Manne ...................................... | 155/188 |
| 2,877,976 | 3/1959 | Massari .................................... | 248/313 |
| 2,928,879 | 3/1960 | Dietrich ................................... | 248/311.2 |
| 3,041,107 | 6/1962 | Schaefer ................................... | 297/248 |
| 3,172,713 | 3/1965 | Rupert ...................................... | 312/235 |
| 3,224,644 | 12/1965 | Davis ........................................ | 222/162 |
| 3,508,732 | 4/1970 | Trachtenberg et al. ................. | 248/226 |
| 3,565,384 | 2/1971 | Lockwood ............................... | 248/312 |
| 4,088,848 | 5/1978 | Weed ....................................... | 248/316.8 |
| 4,446,185 | 5/1984 | Waragai et al. ......................... | 411/178 X |
| 4,697,780 | 10/1987 | Wenkman et al. ...................... | 248/311.2 |
| 4,721,276 | 1/1988 | Moss ........................................ | 248/311.2 |
| 4,865,237 | 9/1989 | Allen ....................................... | 224/22.45 |
| 5,029,936 | 7/1991 | Gonzalez ................................. | 403/338 |
| 5,040,709 | 8/1991 | Neugent ................................... | 224/35 |
| 5,167,392 | 12/1992 | Henricksen ............................. | 248/311.2 |
| 5,213,298 | 5/1993 | Johnson ................................... | 248/313 |
| 5,219,140 | 6/1993 | Spykerman .............................. | 248/311.2 |
| 5,232,137 | 8/1993 | Devine ..................................... | 224/252 |
| 5,249,770 | 10/1993 | Louthan ................................... | 248/311.2 |
| 5,320,319 | 6/1994 | Winger et al. .......................... | 248/312.1 |
| 5,409,336 | 4/1995 | Jericevich et al. ..................... | 248/231.91 |
| 5,421,638 | 6/1995 | Ayotte et al. ............................ | 297/188 |
| 5,496,006 | 3/1996 | Kulka et al. ............................. | 248/231.9 |

FOREIGN PATENT DOCUMENTS

| | | | |
|---|---|---|---|
| 2214086 | 4/1983 | France ..................................... | 411/178 |
| 27 29 565 | 1/1978 | Germany . | |
| 593440 | 10/1947 | United Kingdom .................... | 411/178 |

*Primary Examiner*—Ramon O. Ramirez
*Assistant Examiner*—Anita M. King
*Attorney, Agent, or Firm*—Westman, Champlin & Kelly, P.A.

[57] ABSTRACT

A drink container holder has a receptacle portion for supporting a container and which includes at least one flange extending from a rear portion and a first attachment mechanism located below the at least one flange. A support is securable to a seat back by an attachment member received through an attachment member receiving aperture. The support includes at least one flange receiving opening for receiving the at least one flange and a second attachment mechanism for cooperating with the first attachment mechanism to secure the receptacle to the support and to the seat back in a replaceable fashion.

11 Claims, 8 Drawing Sheets

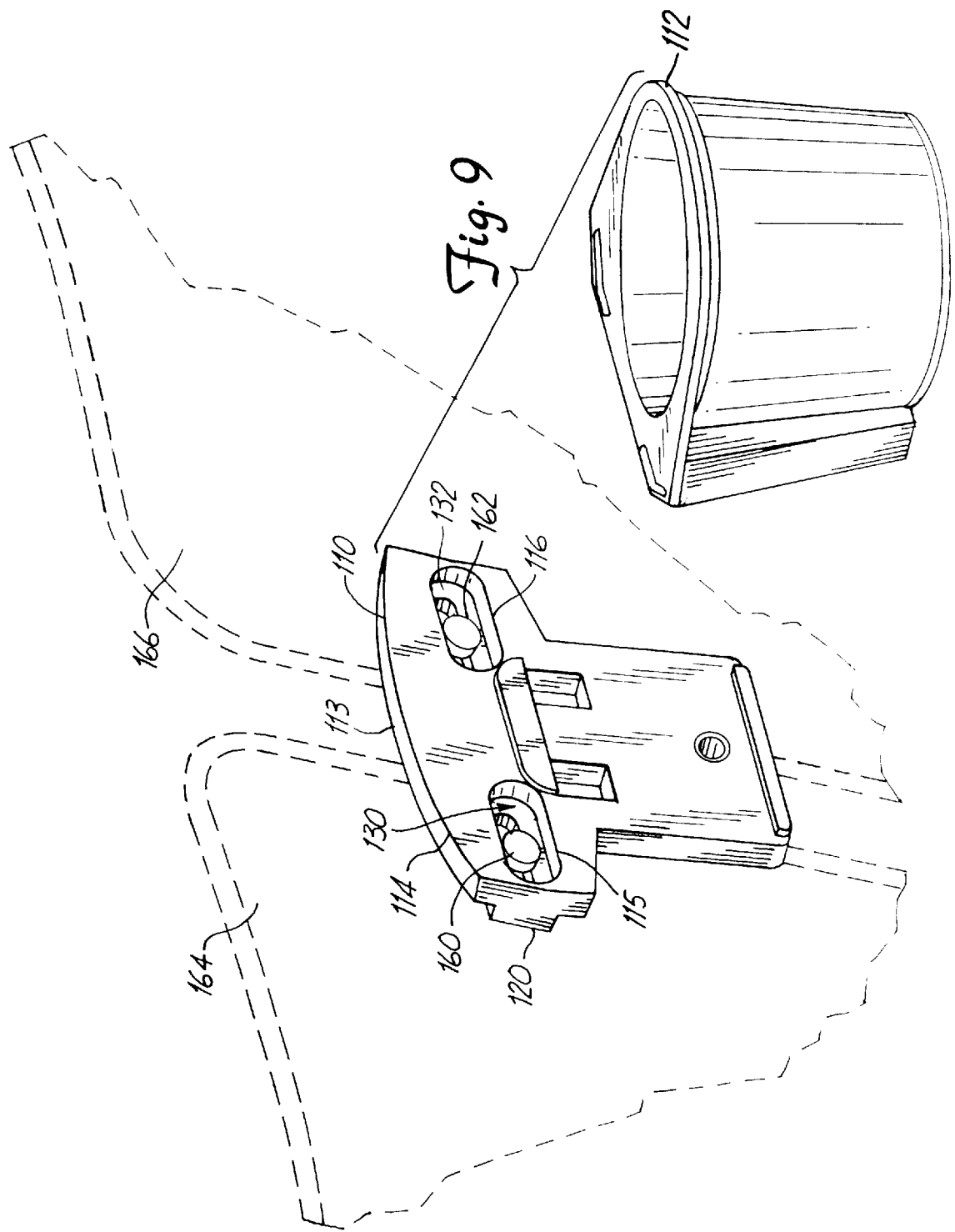

5,813,644

CONTAINER HOLDER WITH SEPARABLE SUPPORT

CROSS REFERENCE TO RELATED APPLICATION

This is a continuation-in-part of my design application Ser. No. 29/034,727 filed Feb. 10, 1995, now U.S. Pat. No. Des. 368,628.

BACKGROUND OF THE INVENTION

The present invention is directed to a device suitable for use as a drink container holder which can be mounted on a seat back or a seat standard. Specifically, the present invention relates to a drink container holder having a receptacle portion which can be easily assembled to a support portion and the seat.

In stadiums, arenas and theaters, a common problem is the lack of a place to rest cups and other containers. Often such containers are placed on the floor or on the arm rest of the seat, only to be accidentally knocked over or otherwise spilled. In the alternative, the occupant of the seat must hold the containers, thereby restricting the use of the occupants hands.

A number of types of container holders have been used to alleviate this problem. Among those are various types of container holders adapted to be mounted to the back of a seat or seat standard, in a permanent or semi-permanent manner. Changing the size of the container for a given mount or support requires an entirely separate mold for all parts.

There is a need for a container holder which can be easily assembled and mounted to a seat back using existing fasteners, and which is easily adaptable for changing the size of the container holder or the type of support.

SUMMARY OF THE INVENTION

The present invention relates to a drink container holder for attachment to one or more seat backs or seat standards. The drink container holder includes an open top receptacle portion and a support portion. The support portion is secured to the seat backs. The open top receptacle is adapted for being attached to the support portion in an easily removable and replaceable fashion. Thus, different sized or shaped receptacle portions can be interchanged for use with a particular or standard support portion, and different support portions can be interchangeably used with a particular receptacle portion.

The open top receptacle portion is adapted for supporting a container and includes at least one flange extending upward from a rear portion and securing portion, such as an attachment member receiving aperture, at a location below the at least one flange. The support portion is securable to a seat back by an attachment member, such as a bolt or screw, received through a support attachment member receiving aperture in the support portion. The support portion includes at least one flange receiving opening for receiving the at least one flange of the open top receptacle portion and an attachment portion, such as a second attachment receiving aperture, for cooperating with the securing portion of the open top receptacle to inhibit movement of the open top receptacle relative to the support.

With the open top receptacle and the support secured to inhibit movement of the open top receptacle relative to the support, the at least one flange of the open top receptacle is held in place inside the at least one flange receiving opening, thereby replaceably securing the open top receptacle to the support. Other open top receptacles having the same or similar flange and securing portion configurations can be used with the support of the present invention. Likewise, other supports having the same or similar flange receiving opening and attachment mechanism configurations can be used with the open top receptacle of the present invention.

BRIEF DESCRIPTION OF THE DRAWINGS

FIG. 9 is a front perspective view which illustrates one method of securing the support portion of the container holder to seat backs or a seat standard to thereby attach the open top receptacle portion to the seat backs.

DETAILED DESCRIPTION OF THE PREFERRED EMBODIMENTS

Figure 1:
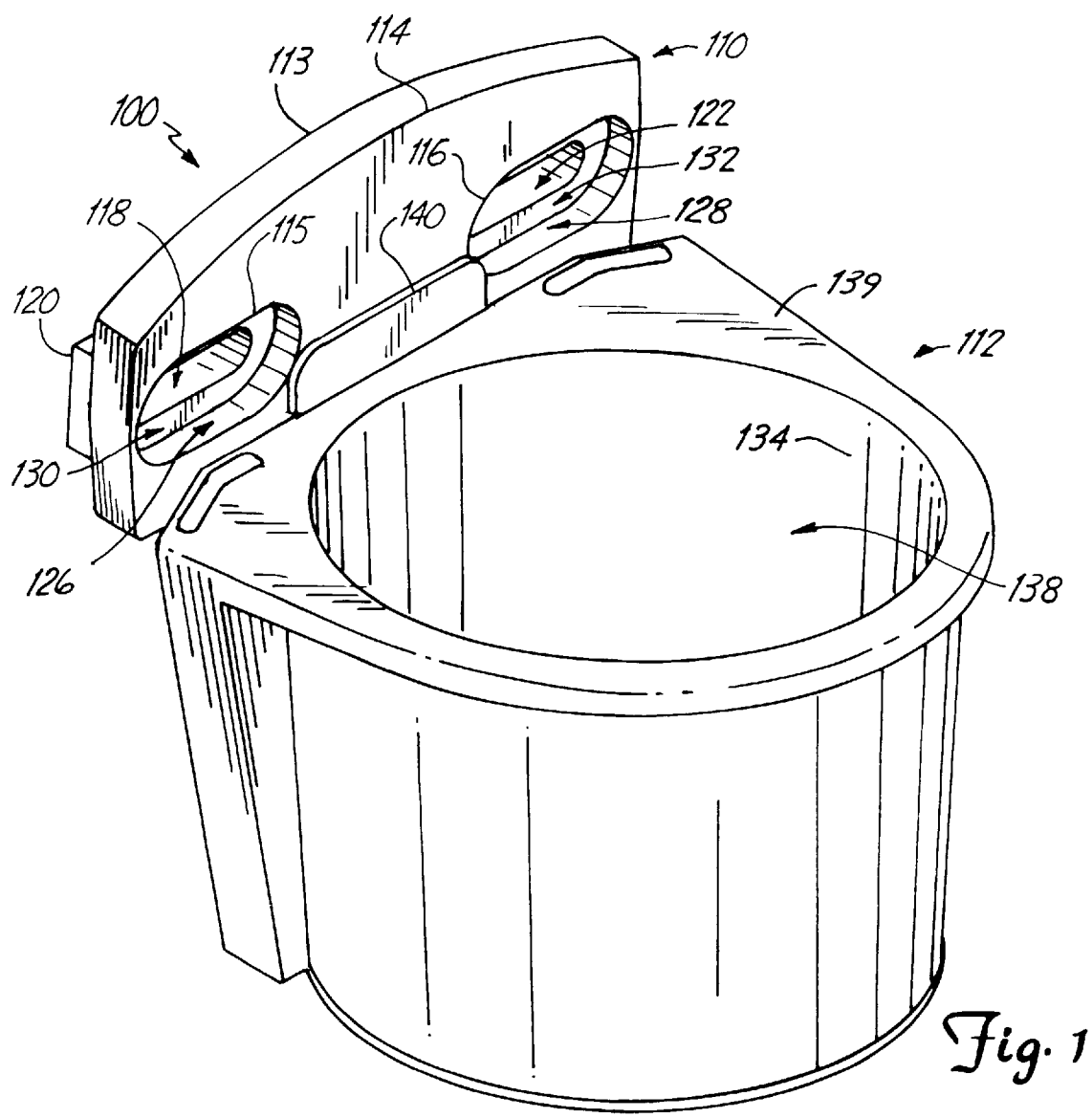
FIG. 1 is a perspective front view of a container holder embodying features of the present invention.

FIG. 1 illustrates drink container holder 100 of the present invention. In preferred embodiments of the present invention, drink container holder 100 is fabricated from a polymeric material such as polypropylene. Holder 100 includes base or support 110 and open top receptacle 112. Open top receptacle 112 is detachably connected to support 110 so that it can be easily assembled. If desired, more than one size receptacle can be used with the same size support, or a different support can be used with the same receptacle.

Figure 2:
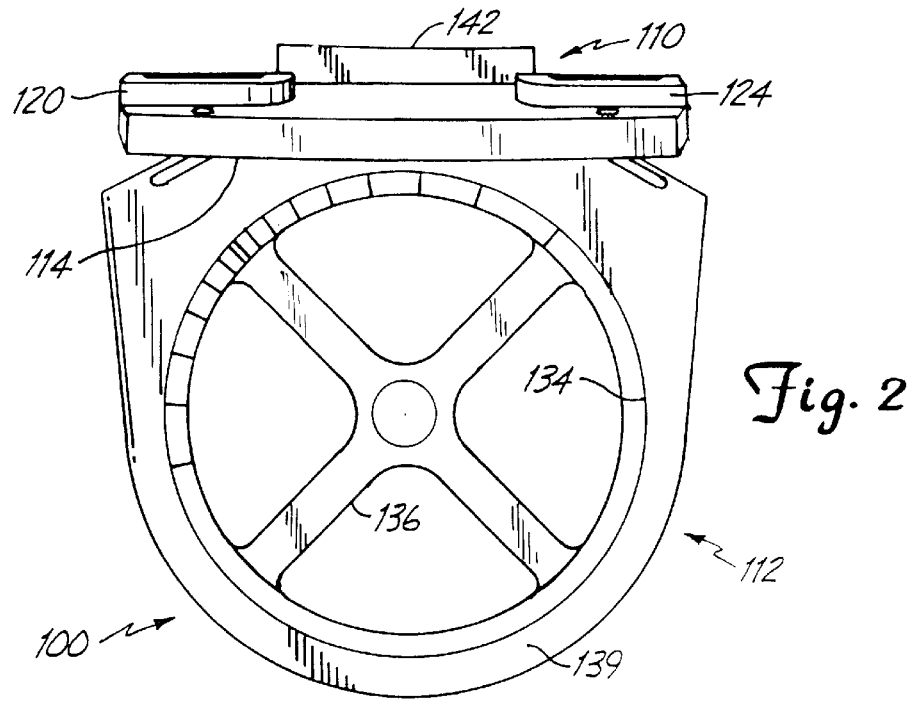
FIG. 2 is a top view of the container holder of FIG. 1.

Support 110 has a seat back side 113 and a receptacle side 114. Support 110 also includes first and second attachment receiving apertures 115 and 116 for alignment with existing attachment receiving holes or apertures in seat backs (and/or in a seat standard) for securing support 110 to the seat backs with an attachment member preferably a capscrew or bolt. Each of apertures 115 and 116 include a first region 118,122 extending through the corresponding one of extensions 120,124 (extension 124 is shown in FIG. 2) and through which attachment members (shown in FIG. 9) are inserted. Each of first and second apertures 115 and 116 also include a second region 126,128. Second regions 126 and 128 of attachment receiving apertures 115 and 116 are larger in size than first regions 118 and 122 such that attachment abutting surfaces 130 and 132 are created in apertures 115 and 116. As illustrated later with reference to FIG. 9, head portions of the attachment members abut surfaces 130 and 132 while threaded attachment members extend through regions 118 and 122 of apertures 115 and 116 to secure support 110 to seat backs. Support 110 also includes lip or ridge 140 which, as will be discussed below in greater detail, aids in securing open top receptacle 112 to support 110.

As shown in FIG. 1, receptacle 112 includes side wall 134, open top 138, and upper surface 139. Upper surface 139 is preferably oriented substantially perpendicular to sidewall 134 and is connected to sidewall 134 to form open top 138 therein. Containers (not shown) are inserted into receptacle 112 through open top 138, and are subsequently held in place by side wall 134. Other features of receptacle 112 are discussed with reference to FIGS. 2–4.

Figure 3:
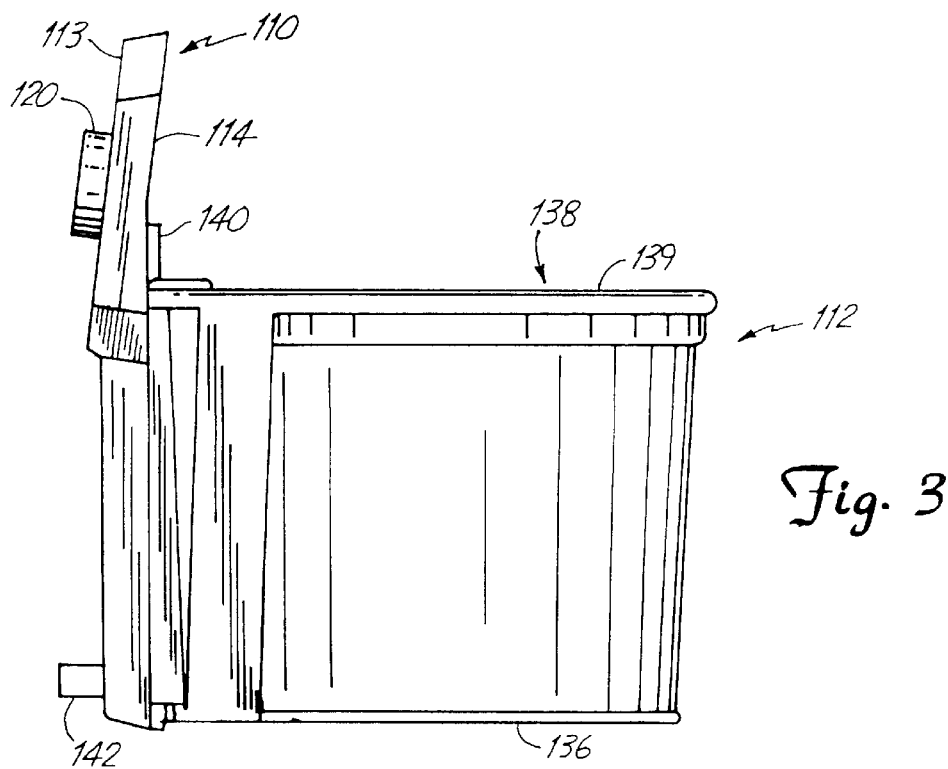
FIG. 3 is a side view of the container holder of FIG. 1.

FIGS. 2 and 3 are top and side views, respectively, which illustrate the features of support 110 and open top receptacle 112 in greater detail. As shown in FIGS. 2 and 3, support 110 further includes lower extension 142 which extends outward from seat back side 113. Also shown in greater detail are first and second extensions 120 and 124 which extend outward from an upper region of seat back side 113 of support 110. When support 110 is secured to one or more seat backs (shown in FIG. 9) by the insertion of threaded attachment members (as shown bolts) through apertures 115,116 and into attachment apertures in the seat backs, extensions 120, 124 and 142 are held in contact with the seat backs.

As shown in the side view of FIG. 3, support 110 also includes lip 140 which aids in attaching receptacle 112 to support 110. This function of lip 140 is discussed in greater detail with reference to FIGS. 5–8.

In addition to side wall 134 and upper surface 139, open top receptacle 112 includes lower end 136, which is positioned opposite open top 138, attached to side wall 134. Lower end 136 is typically oriented substantially perpendicular to sidewall 134 and substantially parallel to upper surface 139. Side wall 134 and lower end 136 together hold a drink container in open top receptacle 112.

Figure 4:
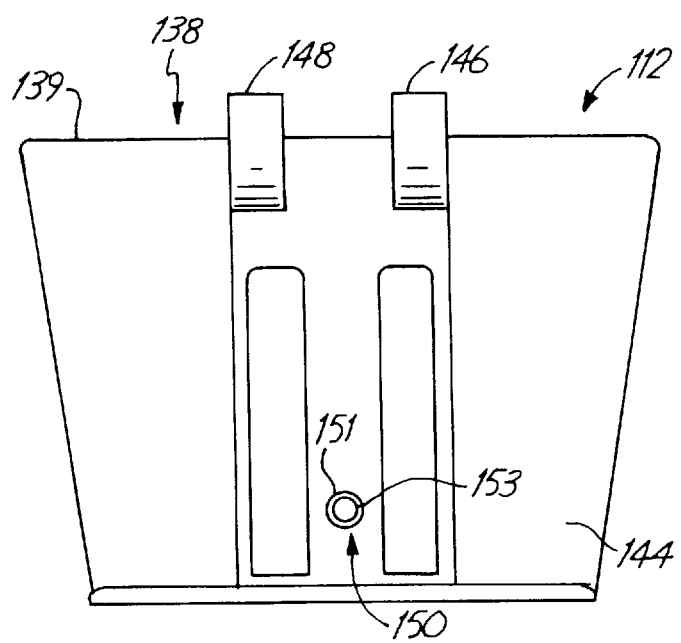
FIG. 4 is a rear view of an open top receptacle portion of the container holder of FIG. 1.

FIG. 4 is a rear view of open top receptacle 112 which illustrates further features of the present invention used to removably or detachably secure receptacle 112 to support 110. As shown, rear outer portion 144 of receptacle 112 includes first and second flanges 146,148 and a protruding member 150. Flanges 146 and 148 extend outward from rear outer portion 144 and upward beyond open top 138 and upper surface 139 of receptacle 112. Although in other embodiments, flanges 146 and 148 can be oriented in a variety of positions, in the preferred embodiment of the present invention, at least the uppermost portions of flanges 146 and 148 are oriented in a substantially vertical direction.

A post or tubular sleeve 150 extends outward from rear outer portion 144 of open top receptacle 112 near the bottom of the receptacle below flanges 146,148. In some preferred embodiments, sleeve 150 is centered horizontally on rear outer portion 144 and between flanges 146 and 148. Post or sleeve 150 has an outer surface 151 and as shown, a bore 153. In these preferred embodiments, sleeve 150 is used to secure receptacle 112 to support 110 and forms a securing portion or second attachment mechanism.

Figure 5:
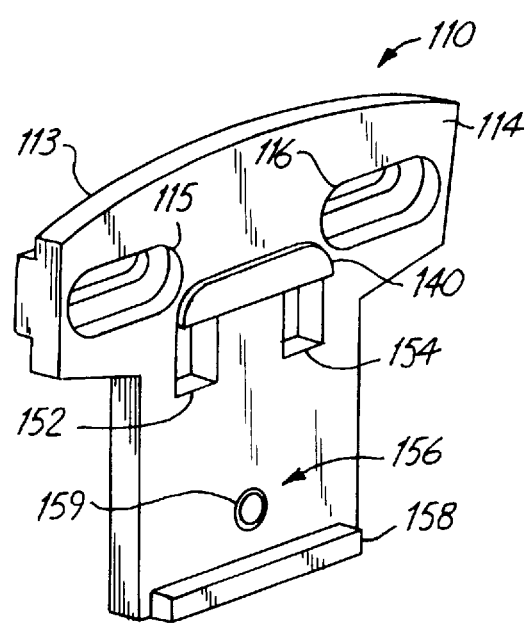
FIG. 5 is a front perspective view of a support portion of the container holder of FIG. 1.
Figure 6:
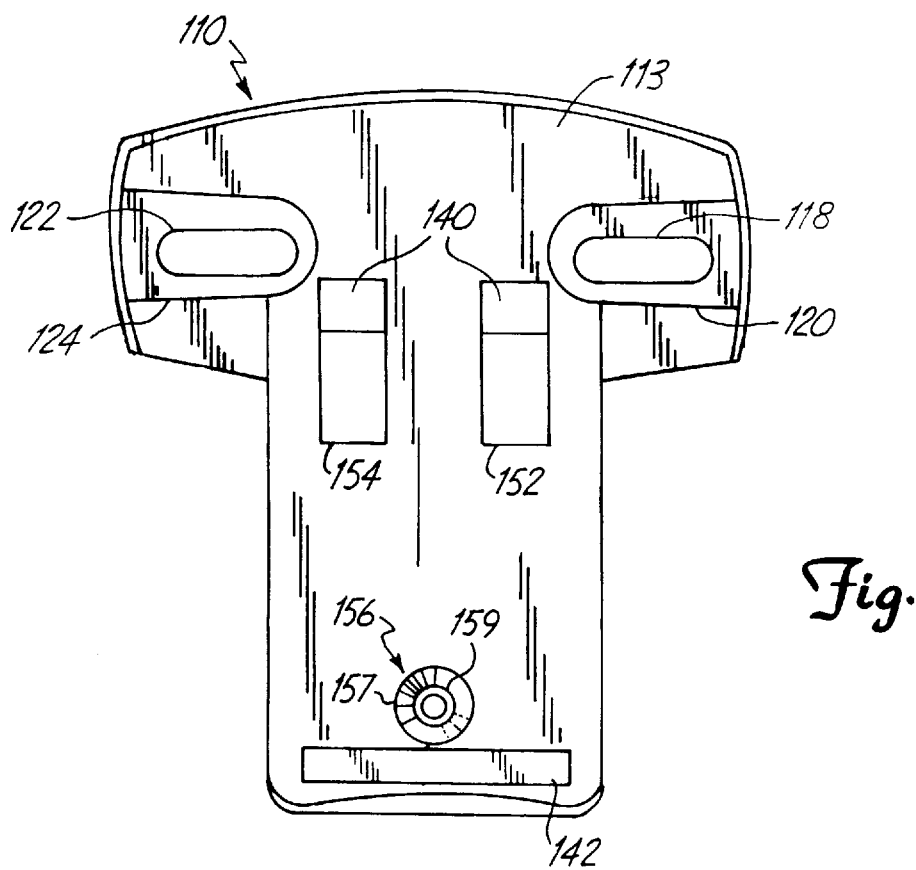
FIG. 6 is a rear view of the support portion of the container holder shown in FIG. 5.

FIGS. 5 and 6 are front perspective and rear views, respectively, of support 110 of the present invention. As illustrated in FIGS. 5 and 6, support 110 includes first and second flange receiving apertures or openings 152 and 154. Lip or ridge 140 extends over an upper portion of each of flange receiving openings 152 and 154 on receptacle side 114 of support 110 such that flange receiving openings 152 and 154 have a size which is larger at seat back side 113 than at receptacle side 114. As is discussed in detail with reference to FIGS. 7 and 8, lip 140 helps to secure open top receptacle 112 to support 110.

Flange receiving openings 152 and 154 are, in some preferred embodiments of the present invention, located at least partially below and between attachment receiving apertures 115 and 116. Flange receiving openings 152,154 are also preferably located in respective positions which are symmetrical about a vertical center of support 110. Flange receiving openings 152,154 have a size which is sufficient such that flanges 146,148 can be inserted therein. Consequently, flange receiving openings 152 and 154 are spaced apart such that each of flanges 146 and 148 may be inserted into a respective one of flange receiving openings 152 and 154 at the same time.

Also as illustrated in FIGS. 5 and 6, support 110 has an opening or aperture 156 positioned in a center region of support 110 slightly above extension 142 and positioned and sized to snugly receive sleeve 150. Opening 156 preferably has a countersunk surface 157 at seat back side 113 which is larger than the bore 159 of opening 156 at receptacle side 114. Bore 159 on receptacle side 114 is preferably slightly smaller than outer surface 151 of sleeve 150 so that, when sleeve 150 is inserted into opening 156 at receptacle side 113, there is a slight interference fit. An attachment member or thread fastener, such as a screw 168, is threaded into bore 153 after sleeve 150 has been inserted into opening 156. This is one possible manner in which receptacle 112 can be attached to support 110 beneath flanges 146,148 and openings 152,154. Other attachment mechanisms can be included on support 110 and receptacle 112, in place of sleeve 150 and opening 156, to secure the receptacle to the support in this region below flanges 146,148 and openings 152,154. For example, a screw can be passed through opening 156 and threaded directly into the wall of the receptacle 112. Also the post or sleeve 150 may be solid, and an attachment member or threaded fastener 168 threaded into the post or sleeve to expand the post or sleeve for securing it in opening 156.

Figure 7:
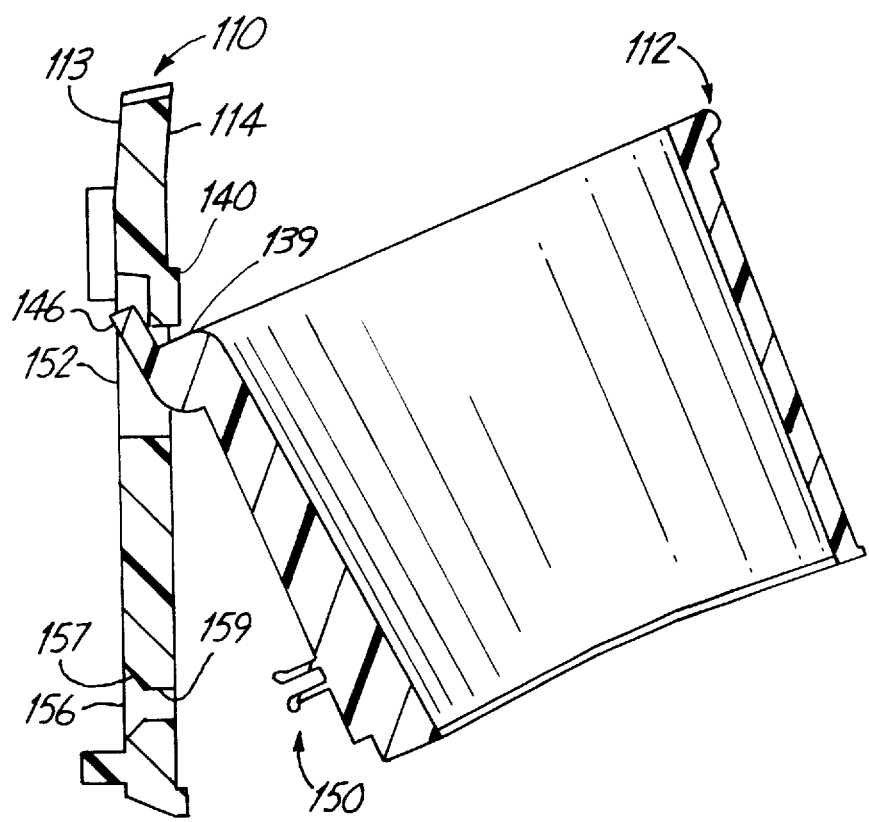
FIGS. 7 and 8 are side views, with portions shown in section, of the container holder of the present invention which illustrate how the open top receptacle portion of the container holder is attached to the support portion in removable fashion.
Figure 8:
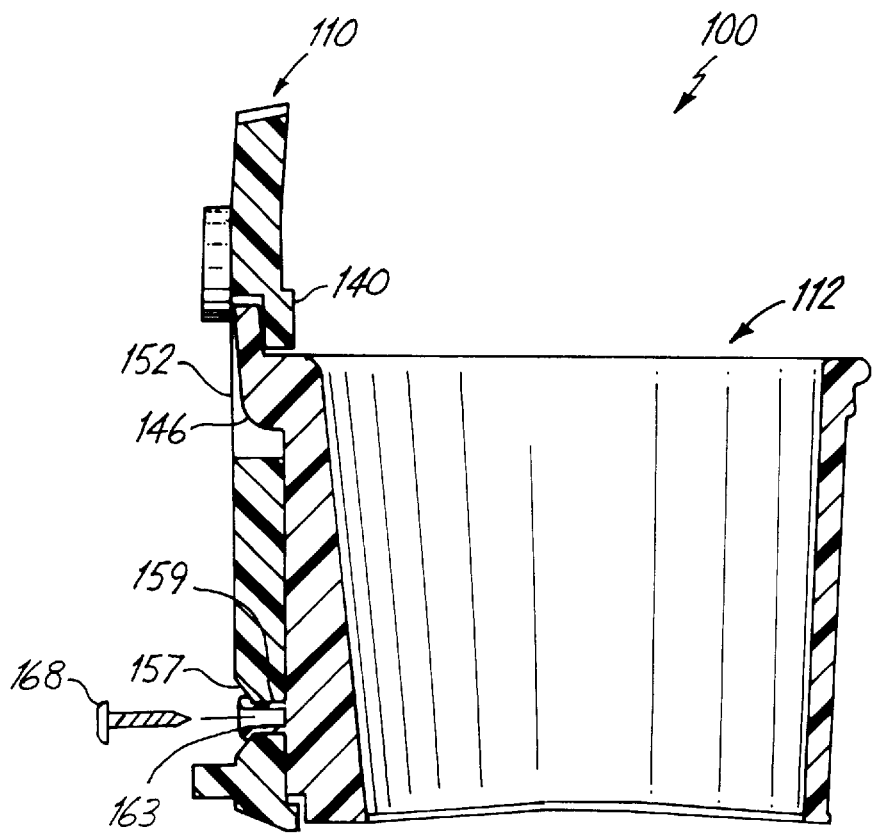

FIGS. 7 and 8 illustrate the preferred manner in which receptacle 112 is secured to support 110. First, with receptacle 112 held at an angle, flanges 146,148 are inserted into respective flange receiving openings 152,154. Next, receptacle 112 is lifted upward such that surface 139 is in contact or near contact with lip 140. In this position, lip 140 acts to resist removal of flanges 146,148 from flange receiving openings 152,154. Then, with sleeve 150 aligned with opening 156, a force is exerted on receptacle 112 which causes sleeve 150 to enter opening 156. After full insertion of sleeve 150 into opening 156, a head or end portion 163 of sleeve 150 is in the countersunk region formed by surface 157.

When an attachment member or threaded fastener such as a screw 168 is inserted, typically by threading into the post or sleeve 150 the lower ends of support 110 and receptacle 112 are secured together and cannot separate. The head of screw 168 expands the end 163 of sleeve 150 into the countersunk region formed by surface 157. The securing of support 110 and the lower end of receptacle 112 in turn prevents flanges 146,148 from being removed from openings 152,154.

If detachment of receptacle 112 from support 110 is desired, attachment screw 168 is removed and the bottom of receptacle 112 is forced outwardly away from support 110 such that receptacle 112 rotates slightly about lip 140 at its point of contact with surface 139. After member 150 is removed from opening 156, flanges 146,148 can be removed from openings 152,154.

FIG. 9 illustrates the attachment of support 110, and thus of receptacle 112, (which will be attached to the support 110) to seat backs 164 and 166. Note that support 110 can be attached to a single seat back as well. Further, support 110 can be attached to a seat standard associated with seat backs 164 and 166. These alternative embodiments are intended to be covered by the present invention as well. With seat back side 113 of support 110 adjacent seat backs 164 and 166, and with apertures 115 and 116 aligned with attachment apertures or openings in seat backs 164 and 166, attachment members (as shown bolts) 160 and 162 are inserted through apertures 115 and 116 and into the openings in seat backs 164 and 166. Attachment members 160 and 162 are tightened until the head portions of attachment members 160,162 force extensions 120,124 firmly against seat backs 164,166.

A benefit of the present invention is that, for a particular support, selected different sized or shaped open top receptacles can be used. Similarly, for a particular open top receptacle, selected different supports can be used. This interchangeability, which is due in part to the manner in which support 110 and receptacle 112 are connected, saves costs and provides the ability to adapt to changing needs. So long as the flanges and openings of the various interchangeable components are universally sized and positioned, the different sizes and types of supports and receptacles can be combined to tailer to the needs of the users and/or to the needs of the establishment owner.

Although the present invention has been described with reference to preferred embodiments, workers skilled in the art will recognize that changes may be made in form and detail without departing from the spirit and scope of the invention. For instance, although flanges 146,148 and protruding member 150 are illustrated in preferred positions, other locations of these elements and their corresponding openings in support 110 are possible without departing from the spirit of the invention. Further, more or fewer flanges can be employed to realize the same advantageous features of the present invention. Also, post or sleeve 150 and opening 156 can be replaced with other attachment mechanisms, which secure the receptacle 112 relative to support 110 at a location spaced from flanges 146,148.

What is claimed is:

1. A drink container holder for use with a seat back, comprising:
   an open top receptacle comprising:
      a side wall;
      a lower end coupled to the side wall and opposite the open top of the receptacle, the side wall and lower end being suitable for supporting a drink container within the receptacle; and
      a substantially vertical rear outer portion, the rear outer portion having at least one flange extending from an upper region of the rear outer portion to a position upwards of the open top of the receptacle, the rear outer portion also having a first attachment mechanism at a location below the at least one flange; and
   a support for attaching the drink container to the seat back, the support comprising:
      a seat back side and a receptacle side;
      a first attachment member receiving aperture extending from the seat back side to the receptacle side and alignable with a hole in the seat back for receiving an attachment member and thereby securing the support to the seat back;
      at least one flange receiving opening extending from the seat back side to the receptacle side for receiving the at least one flange; and
      a second attachment mechanism on the support alignable with the first attachment mechanism of the open top receptacle when the at least one flange is inserted in the at least one flange receiving opening, wherein the open top receptacle is secured to the support and thereby to the seat back by first inserting the at least one flange into the receptacle side of the at least one flange receiving opening and then by attaching the open top receptacle to the support with the first and second attachment mechanisms of the open top receptacle and of the support, wherein the first attachment mechanism of the open top receptacle includes a sleeve extending outward from the rear outer portion at the location below the at least one flange, and wherein the attachment mechanism of the support includes a sleeve receiving opening adapted for receiving the sleeve therein when the at least one flange is inserted into the at least one flange receiving opening, the sleeve being adapted for receiving a threaded attachment after the sleeve is received in the sleeve receiving opening to thereby secure the open top receptacle to the support.

2. The drink container holder of claim 1, wherein the sleeve receiving opening extends from the receptacle side of the support to the seat back side of the support, and wherein the sleeve receiving opening has a surrounding countersunk surface at the seat back side of the support.

3. The drink container holder of claim 2, wherein the sleeve is centered horizontally on the rear outer portion of the open top receptacle, and wherein the sleeve receiving opening is centered horizontally on the support.

4. The drink container holder of claim 3, wherein the at least one flange is positioned in a central area of the upper region of the rear outer portion.

5. The drink container holder of claim 4, wherein the at least one flange receiving opening has a lip blocking an upper portion of the flange receiving opening on the receptacle side of the support such that each flange receiving opening is larger on the seat back side than on the receptacle side and the at least one flange and the at least one flange receiving opening are positioned such that the lip of the at least one flange receiving opening inhibits removal of the at least one flange from the at least one flange receiving opening by applying a force to a receptacle facing side of the at least one flange if the open top receptacle is pulled in a direction substantially perpendicular to at least one flange.

6. The drink container holder of claim 5, wherein the support further comprises a second attachment member receiving aperture extending from the seat back side to the receptacle side and alignable with a second hole in a seat back for receiving a second attachment member and thereby securing the support to the seat back.

7. The drink container holder of claim 6, wherein each of the first and second attachment member receiving apertures has a first size at the seat back side of the support and a second larger size at the receptacle side of the support, within each of the attachment receiving apertures the drink container holder including a passageway for a threaded portion of the corresponding attachment member and an attachment abutting surface against which a head portion of the corresponding attachment member abuts to secure the support to the seat back.

8. A drink container holder, for use with seat backs, comprising:
   an open top receptacle comprising:
      a side wall;
      a lower end opposite the open top suitable for supporting a drink container within the receptacle;
      a rear portion oriented in a substantially upright direction;
      at least one flange positioned in an upper region of the rear portion and extending in a substantially vertical direction upwards of the open top; and
      a first attachment mechanism positioned in a lower region of the rear portion; and
   a base portion securable to the seat backs, the base portion comprising:

a seat back side;

a receptacle side;

a first aperture extending from the receptacle side to the seat back side and alignable with a hole in a seat back for receiving a seat back fastener and thereby securing the base portion to the seat back;

at least one flange receiving opening alignable with the at least one flange of the open top receptacle and adapted for receiving the at least one flange therein, wherein the at least one flange receiving opening of the base portion further includes a lip on the receptacle side such that the at least one flange receiving opening is larger on the seat back side than on the receptacle side;

a second attachment mechanism alignable with the first attachment mechanism of the open top receptacle when the at least one flange is received in the at least one flange receiving opening for securing the open top receptacle to the base portion of the drink container holder.

9. The drink container holder of claim 8, wherein the open top receptacle is attached to the base portion by inserting the at least one flange into the at least one flange receiving opening such that the lip of the at least one flange receiving opening resists the removal of the at least one flange from the at least one flange receiving opening, and by subsequently using the first and second attachment mechanisms to inhibit movement of the open top receptacle relative to the base near the first and second attachment mechanisms.

10. The drink container holder of claim 8 wherein the first attachment mechanism comprises a post integral with the open top receptacle, and the second attachment mechanism comprises a post receiving opening in the base portion for receiving the post.

11. The drink container holder of claim 10 and further including a threaded fastener threaded into the post with the post received in the post receiving opening, the threaded fastener having a head larger than the post receiving opening.

* * * * *